United States Patent
Säilä et al.

(10) Patent No.: US 8,907,895 B2
(45) Date of Patent: Dec. 9, 2014

(54) ELASTIC CONTROL DEVICE AND APPARATUS

(75) Inventors: Sami Säilä, Halikko (FI); Tapani Jokinen, Espoo (FI)

(73) Assignee: Nokia Corporation, Espoo (FI)

( * ) Notice: Subject to any disclaimer, the term of this patent is extended or adjusted under 35 U.S.C. 154(b) by 398 days.

(21) Appl. No.: 13/238,917

(22) Filed: Sep. 21, 2011

(65) Prior Publication Data

US 2013/0069859 A1 Mar. 21, 2013

(51) Int. Cl.
| | |
|---|---|
| G06F 3/033 | (2013.01) |
| G06F 3/0354 | (2013.01) |
| G06F 3/0338 | (2013.01) |
| G06F 3/06 | (2006.01) |

(52) U.S. Cl.
CPC .............. G06F 3/0354 (2013.01); G06F 3/062 (2013.01); G06F 3/0338 (2013.01)
USPC ............................. 345/157; 345/156; 345/162

(58) Field of Classification Search
CPC ... G06F 3/0338; G06F 3/0362; G06F 3/0354; G06F 2200/1637; G01P 15/18; G01P 15/123
USPC ......................................... 345/156, 157, 162
See application file for complete search history.

(56) References Cited

U.S. PATENT DOCUMENTS

| | | | |
|---|---|---|---|
| 2004/0008191 A1* | 1/2004 | Poupyrev et al. | 345/184 |
| 2007/0237170 A1 | 10/2007 | Proctor et al. | |
| 2010/0066668 A1* | 3/2010 | Wong et al. | 345/156 |
| 2011/0316611 A1* | 12/2011 | Gustavsson | 327/516 |
| 2012/0154288 A1* | 6/2012 | Walker | 345/169 |
| 2012/0255349 A1* | 10/2012 | Pop et al. | 73/146.5 |

FOREIGN PATENT DOCUMENTS

| | | |
|---|---|---|
| EP | 0929027 | 7/1999 |
| EP | 2202624 | 6/2010 |
| EP | 2287702 | 2/2011 |
| WO | WO2009063413 | 5/2009 |
| WO | WO2010004080 | 1/2010 |
| WO | WO 2010041227 A1 * | 4/2010 |

OTHER PUBLICATIONS

Hachet, M. et al., "3D Elastic Control for Mobile Devices", IEEE Computer Society, Mobile Graphics, Jul./Aug. 2008, pp. 58-62.
Schwesig, C. et al., "Gummi: A Bendable Computer", ACM, CHI 2004, 8 pages.
International Search Report for International Application No. PCT/FI2012/050891, Date of Completion: Feb. 26, 2013, 5 pages.
Goyal, N., "COMET: Collaboration in Mobile Environments by Twisting", Supplementary Proceedings of the 11th European Conference on Computer Supported Cooperative Work, Wein,Austria, Sep. 7-11, 2009, pp. 29-30.

(Continued)

*Primary Examiner* — Lixi C Simpson
(74) *Attorney, Agent, or Firm* — Locke Lord LLP

(57) ABSTRACT

An apparatus including at least one processor, and at least one memory including computer program code, the at least one memory and the computer program code configured to, with the at least one processor, cause the apparatus to receive deformation information from an elastic control device operated by a user. The apparatus is further configured to determine a control signal for the apparatus based on the deformation information, and performing a function associated to the control signal.

20 Claims, 4 Drawing Sheets

(56) References Cited

OTHER PUBLICATIONS

Scott, J. et al., "Mobile Device Interaction with Force Sensing", Pervasive 2009, LNCS 5538, pp. 133-150, 2009.

PCT Written Opinion of the International Preliminary Examining Authority for International Application No. PCT/FI2012/050891 dated Nov. 11, 2013, 8 pages.

* cited by examiner

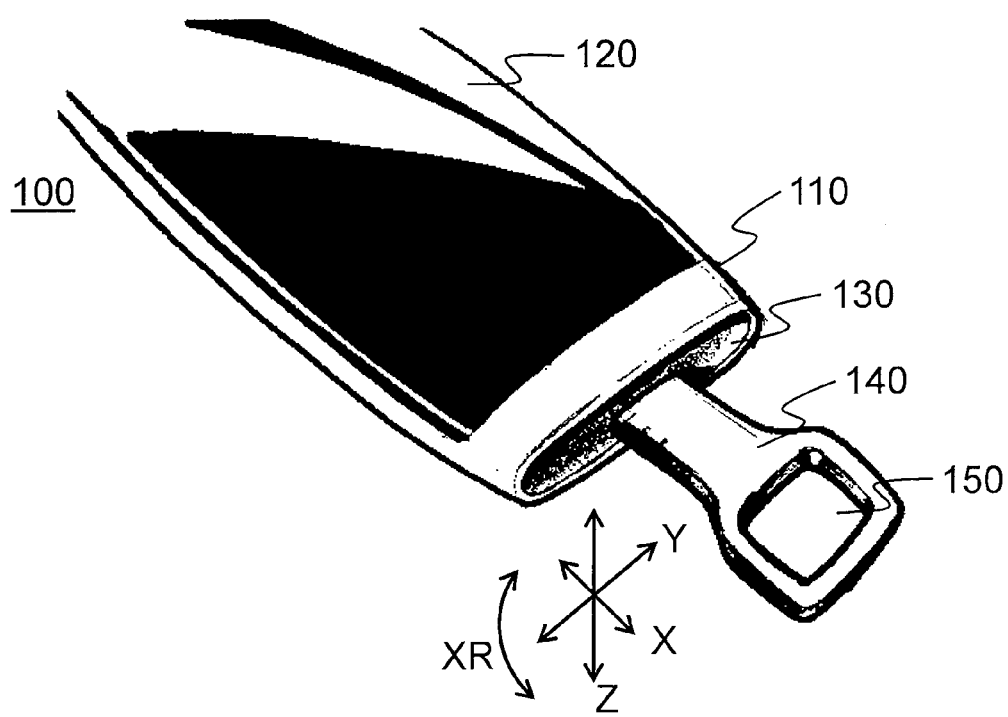
Fig. 1
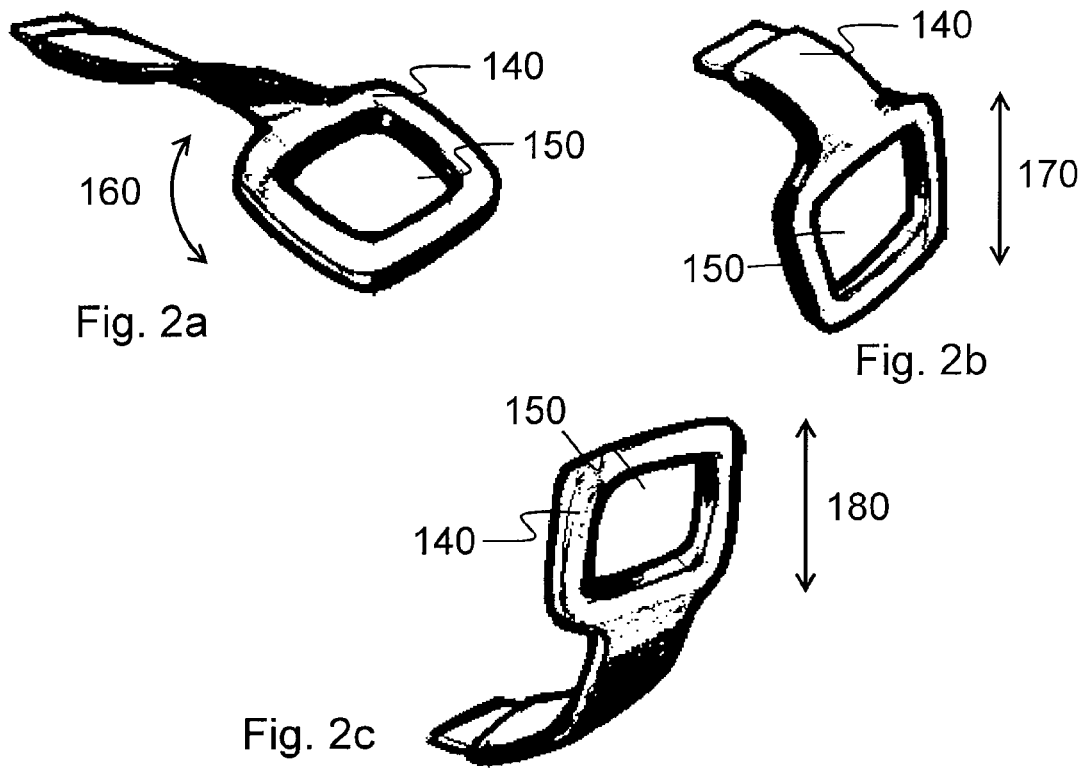
Fig. 2a
Fig. 2b
Fig. 2c

ELASTIC CONTROL DEVICE AND APPARATUS

TECHNICAL FIELD

The present application generally relates to a method and elastic control device for controlling an apparatus.

BACKGROUND ART

A mobile apparatus may receive input via different alternatives sources, such as a touchpad, touchscreen, a key, a keypad, a stick, a mouse or a stylus. Interacting with the mobile apparatus with alternative ways may provide new experiences to mobile device users.

SUMMARY

According to a first example aspect of the invention there is provided an apparatus comprising:
- at least one processor; and
- at least one memory including computer program code;
- the at least one memory and the computer program code configured to, with the at least one processor, cause the apparatus to:
- receive deformation information from an elastic control device operated by a user;
- determine a control signal for the apparatus based on the deformation information; and
- performing a function associated to the control signal.

In an embodiment, the apparatus further comprises a housing part, wherein the elastic control device is configured to be deformable in at least one dimension in relation with the housing part. The housing part may further comprise a front surface with a display and a side surface with an interface for the elastic control device. Furthermore, the apparatus may comprise a storage configured to receive the elastic control device.

The deformation dimension may comprise at least one of the following:
- dimension perpendicular to the front surface;
- dimension perpendicular to the side surface; and
- dimension parallel to the side surface.

In an embodiment, the control signal is configured to control at least one of the following: the housing part, a function of the housing part, an application of the housing part, and a user interface of a computer connected to the apparatus. The function may comprise at least one of the following:
- control information for a user interface of the apparatus;
- volume control;
- gaming control;
- music playing control;
- browsing control; and
- navigation control.

The elastic control device may comprise an elastic extension of the apparatus and a control device. The elastic extension may further comprise an operating position for receiving the control device.

According to a second example aspect of the invention there is provided an elastic control device comprising:
- an elastic member configured to be deformed by a user;
- a detector configured to detect the deformation for providing deformation information; and
- an interface configured to transmit the deformation information to an apparatus.

In an embodiment, the detector comprises at least one strain gauge or at least one piezoelectric sensor for sensing deformation. The housing part of the apparatus and the elastic control device may be configured to be coupled mechanically. Furthermore, a housing part of the apparatus and the elastic control device may be configured to be connected wirelessly.

The elastic control device may be configured to be deformable in three dimensions in relation with a housing part of the apparatus. The elastic control device may further comprise at least one of the following:
- memory;
- antenna; and
- energy harvester using piezo bending.

The elastic control device may further comprise an elastic extension of the apparatus and a control device. The control device may comprise a headset, for example. Furthermore, the elastic extension may be configured to comprise an operating position for receiving the control device.

According to a third example aspect of the invention there is provided a method comprising:
- detecting deformation of an elastic control device for providing deformation information;
- determining a control signal for an apparatus based on the deformation information; and
- defining a function for the apparatus associated to the control signal.

According to a fourth example aspect of the invention there is provided a computer program embodied on a computer readable medium comprising computer executable program code which, when executed by at least one processor of an apparatus, causes the apparatus to:
- detect deformation of an elastic control device for providing deformation information;
- determine a control signal for an apparatus based on the deformation information; and
- define a function for the apparatus associated to the control signal.

Different non-binding example aspects and embodiments of the present invention have been illustrated in the foregoing. The above embodiments are used merely to explain selected aspects or steps that may be utilized in implementations of the present invention. Some embodiments may be presented only with reference to certain example aspects of the invention. It should be appreciated that corresponding embodiments may apply to other example aspects as well.

BRIEF DESCRIPTION OF THE DRAWINGS

The invention will be described, by way of example only, with reference to the accompanying drawings, in which:

FIG. 1 shows a schematic picture of an apparatus and an elastic control device in an operating mode of a first dimension of deformation according to an example embodiment of the invention;

FIG. 2a shows a schematic picture of an elastic control device in a second dimension of deformation according to an example embodiment of the invention;

FIG. 2b shows a schematic picture of an elastic control device in a third dimension of deformation according to an example embodiment of the invention;

FIG. 2c shows another schematic picture of an elastic control device in a third dimension of deformation according to an example embodiment of the invention;

DETAILED DESCRIPTION

Figure 3:
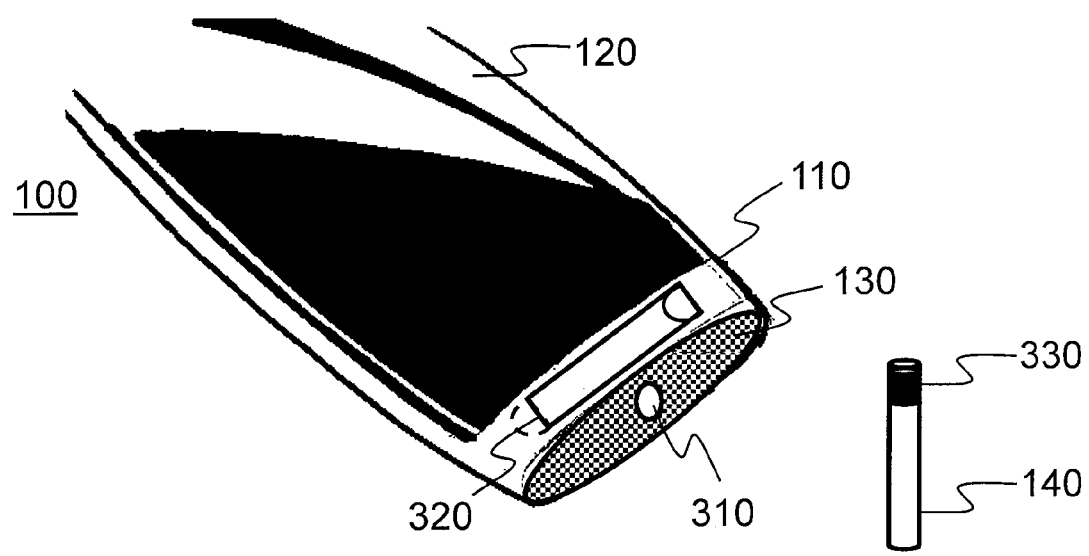
FIG. 3 shows a schematic picture of an apparatus and an elastic control device in another operating mode according to an example embodiment of the invention.

In the following description, like numbers denote like elements.

FIG. 1 shows a schematic picture of an apparatus 100 in an operating mode of a first dimension of deformation according to an example embodiment of the invention. The apparatus 100 comprises a housing part 110. The housing part 110 comprises a front surface 120 that comprises a user interface component, for example a touch screen. The housing part 110 further comprises a side surface 130 that comprises interface for connecting accessories, for example. The apparatus 100 may be operationally connected with an elastic control device 140. In this example embodiment of FIG. 1, the elastic control device 140 is operationally connected to the apparatus 100 using an interface on the side surface 130 of the apparatus 100. The elastic control device 140 may also be operationally connected to the apparatus 100 using an interface on any surface of the apparatus 100, for example the front surface 120 or the back surface. In an embodiment, the elastic control device 140 may also be wirelessly connected to the apparatus 100 without any mechanical connection. In an embodiment, the elastic control device 140 may provide sensor functionalities to the apparatus 100 that does not comprise any sensor as such.

In the example embodiment of FIG. 1, the apparatus 100 and the elastic control device 140 are in operation mode. The elastic control device may be deformed to different dimensions in relation to the housing part 110 for generating a control signal for the apparatus 100. In the example embodiment of FIG. 1, the housing part 110 and the elastic control device 140 are in a rest position in which the housing part 110 and the elastic control device 140 are not moved relative to each other.

In an embodiment, the elastic control device 140 may be elastically moved to any dimension of X-, Y- or Z-axis shown in FIG. 1. Furthermore, the elastic control device 140 may be elastically rotated around any of the above axes X, Y or Z, as illustrated by one example rotation XR around the X-axis. As an example, a first dimension of deformation may be movement of the elastic control device 140 in relation with the housing part 110 in a direction of the X-axis. The elastic control device 140 is configured to be moveable in dimension essentially perpendicular to the side surface 130 of the apparatus 100. The elastic control device 140 may thus be stretched to produce a first control signal. Also squeezing may be used. The first control signal may comprise a selection signal or an activation signal, for example.

FIG. 2a shows a schematic picture of an elastic control device 140 in a second dimension of deformation according to an example embodiment of the invention. The second dimension of deformation may be movement of the elastic control device 140 in relation with the housing part 110 in a direction of an arrow 160. The elastic control device 140 is configured to be moveable in dimension essentially parallel to the side surface 130 of the apparatus 100. The elastic control device 140 may thus be twisted to produce a second control signal. The second control signal may comprise a browsing signal, a scrolling signal, an up/down signal or a next/previous signal, for example. Twisting the elastic control device 140 may thus generate any kind of vertical or horizontal movement control signal for the apparatus 100.

FIG. 2b shows a schematic picture of an elastic control device 140 in a third dimension of deformation according to an example embodiment of the invention. The third dimension of deformation may be movement of the elastic control device 140 in relation with the housing part 110 in a direction of an arrow 170. The elastic control device 140 is configured to be moveable in dimension essentially perpendicular to the front surface 120 of the apparatus 100. The elastic control device 140 may thus be bent to produce a third control signal.

FIG. 2c shows another schematic picture of an elastic control device 140 in a third dimension of deformation according to an example embodiment of the invention. The third dimension of deformation may be movement of the elastic control device 140 in relation with the housing part 110 in a direction of an arrow 180. The elastic control device 140 is configured to be moveable in dimension essentially perpendicular to the front surface 120 of the apparatus 100. The elastic control device 140 may thus be bent to produce a third control signal. The third control signal may comprise a zoom signal, for example. Bending the elastic control device 140 towards the user may generate a zoom out signal and bending the elastic control device 140 away from the user may generate a zoom in signal, for example. Volume control signal may be generated using the third control signal, as well. The user may also stretch, twist and bend the elastic control device 140 simultaneously and thus at least two different control signal may be generated at the same time.

In an embodiment, as showed in FIGS. 1 and 2a-c, the elastic control device 140 may be configured to comprise a grip member 150. The grip member 150 may be configured to be easily operated by a user of the apparatus 100, for example by a finger. The apparatus 100 may be held in a pocket, for example, in such a way that the grip member 150 of the elastic control device 140 is operable. The user may use a finger to control the apparatus 100. Such operation enables the controlling of the apparatus 100 without taking the apparatus 100 out of the pocket. Controlling of the apparatus 100 may comprise signals of for example game control, music control, web browsing and navigation. The grip member 150 may be squeezed to produce a fourth control signal. The fourth control signal may comprise a selection signal or an activation signal, for example. The grip member 150 may also be configured to be used for getting the apparatus 100 out of the user's pocket, for example, by entering a finger through the opening of the grip member 150 and pulling the apparatus out.

The different deformation dimensions available and the different control signals generated by the deformations are not limited to the combinations explained but are illustrative example embodiments only. Deformation movement and or rotation to any dimension in X-, Y- and Z-axes may take place simultaneously and detected. Any deformation may be linked with any control signal and the link may be defined by the user of the apparatus 100. The user may also define a sequence of deformation movements as a macro for a control signal.

In an embodiment, the housing part 110 and the elastic control device 140 are configured to be coupled mechanically via an electromechanical coupling. The electromechanical coupling may be implemented using an electrical connection with a mechanical locking. The electrical connection may be a wired connection, or a wireless connection. The wireless connection may comprise infrared (IR), Bluetooth or radio frequency identification (RF ID), for example. The wired connection may comprise universal serial bus (USB), for example.

In an embodiment, the housing part 110 comprises user interface. The user interface is configured to show information to the user. The user interface is configured to provide the user a way to interact with the apparatus 100. Examples of the interaction comprises but are not limited to using the control device 140 as an input, that may generate a control signal by moving the control device 140. Another example of the interaction comprises controlling the housing part 110 by deforming the control device 140, for example for navigation application running in the apparatus 100, or a gaming application running in the apparatus 100. The control device 140 may be used for example for activating an application in the apparatus 100 or ending an application in the apparatus 100. Furthermore, the elastic control device 140 may be used for controlling different functions of the apparatus 100, like volume and/or illumination. In some or all of the example embodiments the elastic control device provides a user friendly way to control the apparatus 100 and/or different functions of the apparatus 100, without necessarily seeing the housing part 110 of the apparatus 100. For example, when the apparatus 100 is inside a pocket of the user or otherwise in a blind location.

FIG. 3 shows a schematic picture of an apparatus 100 and an elastic control device 140 in another operating mode according to an example embodiment of the invention. The apparatus 100 comprises a housing part 110. The housing part 110 comprises a front surface 120 that comprises a user interface component, for example a touch screen. The housing part 110 further comprises a side surface 130 that comprises interface for connecting accessories, for example. The apparatus 100 may be operationally connected with an elastic control device 140. In this example embodiment of FIG. 3, the elastic control device 140 is operationally connected to the apparatus 100 using an interface 310 on the side surface 130 of the apparatus 100.

In the example embodiment of FIG. 3, the apparatus 100 and the elastic control device 140 are not in operation mode. The elastic control device 140 is not connected to the interface 310 of the apparatus 100. Operation mode is enabled by connecting the elastic control device 140 to the interface 310. The elastic control device 140 may comprise an electrical connector 330 in one end of the device 140 for connecting to the apparatus 100. The elastic control device 140 may also comprise a wireless connecting means for communicating with the apparatus 100. The elastic control device 140 may be deformed to different dimensions in relation to the housing part 110 for generating a control signal for the apparatus 100. Similar deformations are applicable in this embodiment as showed earlier for FIGS. 1 and 2a-c. In the example embodiment of FIG. 1, the housing part 110 and the elastic control device 140 are in a rest position in which the housing part 110 and the elastic control device 140 are not moved relative to each other. When the elastic control device 140 is not used by the user of the apparatus 100, the elastic control device 140 may be positioned to a storage 320 configured to receive the elastic control device 140. The storage 320 may be located also in a protective cover or bag configured to protect the apparatus 100.

In an embodiment, the apparatus 100 and the elastic control device 140 comprise movement sensors for detecting movement. When the user places the elastic control device 140 to the storage 320 and the apparatus 100 determines movement in same phase with the elastic control device 140, the apparatus 100 is configured to determine that the elastic control device 140 and the apparatus 100 belong together. Such feature may be used for example for pairing a new elastic control device 140 with the apparatus 100. The user of the apparatus 100 may place any elastic control device 140 to the storage 320 for pairing. Thus, a variety of elastic control devices 140 may be used, for example a headset with a movement sensor and a detector for sensing deformation.

Figure 7:
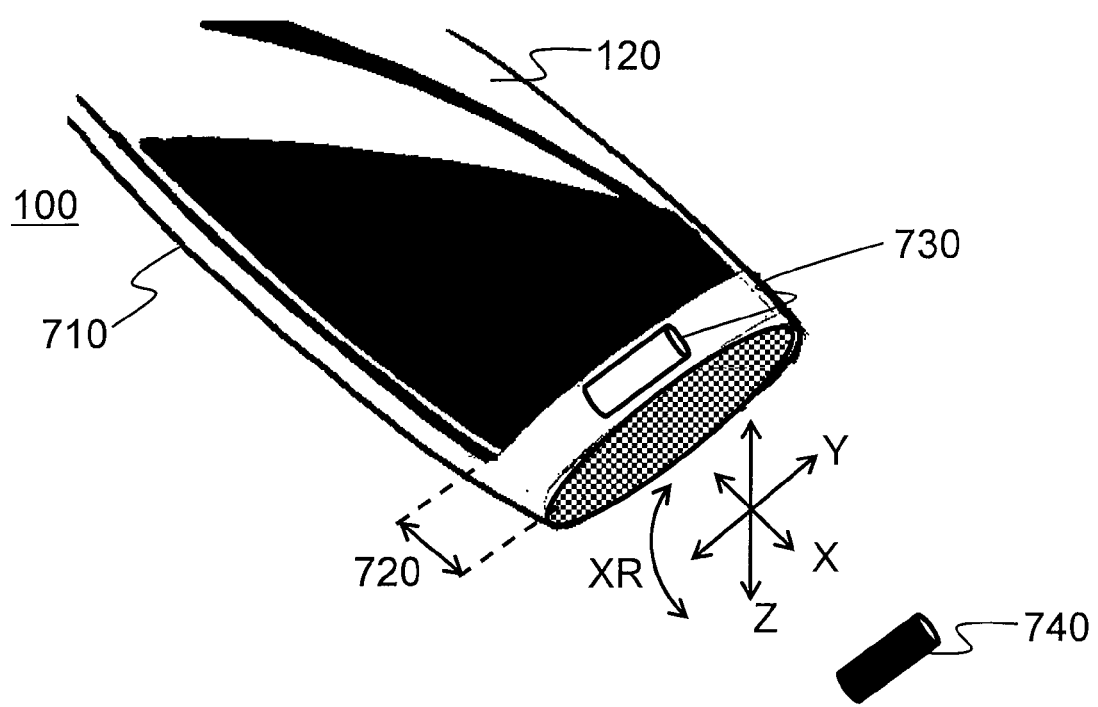
FIG. 7 shows a schematic picture of an apparatus and an elastic control device in another operating mode according to an example embodiment of the invention.

FIG. 7 shows a schematic picture of an apparatus 100 and an elastic control device in another operating mode according to an example embodiment of the invention. The apparatus 100 may comprise an elastic cradle 710 extending at least in one end beyond the dimensions of the apparatus housing part 110 of FIG. 1. Such extension 720 comprises an operating position 730 for a control device 740. The extension 720 may be elastically moved to any dimension of X-, Y- or Z-axis shown in FIG. 7. Furthermore, the extension 720 may be elastically rotated around any of the above axes X, Y or Z, as illustrated by one example rotation XR around the X-axis. In an embodiment, the control device 740 is placed to the operating position 730. In such embodiment the elastic extension 720 and the control device 740 may form together the elastic control device. In an embodiment, the control device 740 may provide sensor functionalities to the apparatus 100 that does not comprise any sensor as such.

The deformation movement of the extension 720 in relation to the housing part of the apparatus 100 is configured to be detected by the detector comprised in the control device 740. In another example embodiment, an absolute movement of the whole apparatus 100 is configured to be detected by a detector. The detector, or detecting means, may be one of the following but not limited to a gyroscope, an accelerometer and an optical sensor. In an example embodiment, the number of detectors in the apparatus is more than one, for example two. The two detectors may be implemented one in the housing part of the apparatus 100 and one in the control device 740. The location of the detector may vary in that the detector may be implemented in the housing part or the detector may be implemented in the control device 740.

The detected movement of the elastic control device comprising the extension 720 and the control device 740 is configured to provide the deformation information for control signal determination and processing as by a processor in an apparatus 100. The control device 740 may comprise for example a headset comprising the detector for detecting movement, and wireless communication means for communicating the deformation information to the apparatus 100.

In an embodiment, the apparatus 100 comprises an elastic extension 720 as a part of the housing of the apparatus 100, without a need for a separate elastic cradle 710. The elastic extension 720 may be attached to the apparatus 100 in manufacturing phase or as an accessory by the user later on. The elastic extension 720 may be an exchangeable cover for the apparatus 100, as well.

In an embodiment, the apparatus 100 and the control device 740 comprise movement sensors for detecting movement. When the user places the control device 740 to the operating position 730 and the apparatus 100 determines movement in same phase with the control device 740, the apparatus 100 is configured to determine that the elastic control device comprising the elastic extension 720 and the control device 740 belong together with the apparatus 100. Such feature may be used for example for pairing a new elastic control device with the apparatus 100. The user of the apparatus 100 may place any control device 740 to the operating position 730 for pairing. Thus, a variety of control devices 740 may be used, for example a headset with a movement sensor, and a detector, for sensing deformation.

In an embodiment, when the user removes the control device 740 from the operating position 730 and the apparatus 100 determines movement is out of phase with the control device 740, the apparatus 100 is configured to determine that the elastic control device comprising the elastic extension 720 and the control device 740 does not belong together anymore with the apparatus 100. Such feature may be used for example for removing the pairing between the elastic control device and the apparatus 100.

In an embodiment, an elastic control device 140 of FIG. 1 may be used as an elastic extension 720. A control device 740 may be attached to the elastic control device 140 in similar fashion as described for FIG. 7. The user of the apparatus 100 may attach any control device 740 to the elastic control device 140 for pairing. The attachment may be done by arranging an appropriate slot to the elastic control device or by a clip, for example. Thus, a variety of control devices 740 may be used, for example a headset with a movement sensor, and a detector, for sensing deformation.

Figure 4:
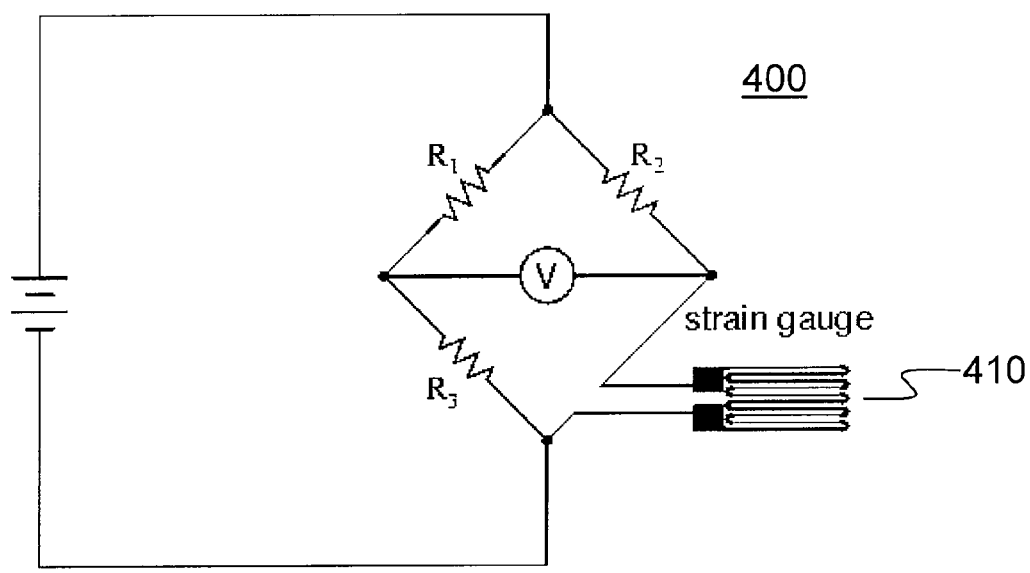
FIG. 4 presents a schematic picture of a detector operation configured to sense the deformation of the elastic control device according to an example embodiment of the invention.

FIG. 4 presents a schematic picture of a detector 400 operation configured to sense the deformation of the elastic control device 140 according to an example embodiment of the invention. The detector 400 may comprise a strain gauge 410, for example. If a strip of conductive metal is stretched, the strip's outer dimensions may change and the strip of conductive metal may become thinner in lateral direction and longer in longitudinal direction, both changes resulting in an increase of electrical resistance end-to-end. Conversely, if a strip of conductive metal is placed under compressive force (without buckling), the strip's outer dimensions may change and the strip of conductive material may become wider in lateral direction and shorter in longitudinal direction, as an example. If these stresses are kept within the elastic limit of the metal strip (so that the strip does not permanently deform), the strip can be used as a measuring element for physical force, the amount of applied force inferred from measuring its resistance. Such a device is called a strain gauge. Strain gauges are used to measure the stresses effecting on them and may look something like drawn as symbol for the strain gauge 410 in FIG. 4.

In an embodiment, the strain gauge's 410 conductors may be made of round wire, about 1/1000 inch in diameter, for example. Alternatively, the strain gauge 410 conductors may be thin strips of metallic film deposited on a non-conducting substrate material called the carrier. The gauges 410 may be glued to a larger structure under stress, for example the elastic body material of the control device 140. Typical strain gauge resistances range from 30Ω to 3 kΩ (unstressed). This resistance may change only a fraction of a percent for the full force range of the gauge, given the limitations imposed by the elastic limits of the gauge material and of the test specimen.

In an embodiment, the strain gauge 410 is configured to use a bridge measurement circuit. Unlike the Wheatstone bridge using a null-balance detector and a human operator to maintain a state of balance, a strain gauge bridge circuit of FIG. 4 indicates measured strain by the degree of imbalance, and uses a precision voltmeter in the center of the bridge to provide an accurate measurement of that imbalance. Typically, the rheostat arm of the bridge (R2) is set at a value equal to the strain gauge resistance with no force applied. The two ratio arms of the bridge (R1 and R3) are set equal to each other. Thus, with no force applied to the strain gauge, the bridge will be symmetrically balanced and the voltmeter will indicate zero volts, representing zero force on the strain gauge. As the strain gauge is either compressed or tensed, its resistance will decrease or increase, respectively, thus unbalancing the bridge and producing an indication at the voltmeter. This arrangement, with a single element of the bridge changing resistance in response to the measured variable (mechanical force), is known as a quarter-bridge circuit as in FIG. 4.

Furthermore, other bend sensors measuring the amount of deflection caused by bending the sensor may be used. There are various ways of sensing deflection, from strain-gauges to hall-effect sensors. For example, conductive ink-based sensors, fiber-optic sensors or conductive fabric/thread/polymer-based sensors may be used.

A property of bend sensors worth noting is that bending the sensor at one point to a prescribed angle is not the most effective use of the sensor. As well, bending the sensor at one point to more than 90° may permanently damage the sensor. Instead, bending the sensor around a radius of curvature is preferred. The smaller the radius of curvature and the more the whole length of the sensor is involved in the deflection, the greater the resistance will be (which will be much greater than the resistance achieved if the sensor is fixed at one end and bent sharply to a high degree).

In an embodiment, multiple bending sensors, such as strain gauges 410, may be comprised in the detector 400. The multiple bending sensors may be configured to sense deformation of essentially different dimensions. Such dimensions may comprise, for example:

dimension perpendicular to the front surface of the apparatus;

dimension perpendicular to the side surface of the apparatus; and dimension parallel to the side surface of the apparatus.

In an embodiment, the detector 400 may be one of the following but not limited to a gyroscope, an accelerometer and an optical sensor. In an example embodiment, the number of detectors in the apparatus is more than one, for example two. The two detectors may be implemented one in the housing part of the apparatus 100 and one in the elastic control device 140. The location of the detector may vary in that the detector may be implemented in the housing part or the detector may be implemented in the elastic control device 140.

In an embodiment, deformation information from an elastic control device 140 operated by a user is used to determine a control signal for the apparatus 100 and performing a function associated to the control signal. The detected deformation is configured to be processed as an input signal by a processor in an apparatus 100. The processor may be one of the following but not limited to: Central Processing Unit (CPU), Microprocessor and Digital Signal Processor (DSP). The input signal is configured to be transmitted to, or detected by, the apparatus 100. The input signal may be configured to generate a change on a display of the housing part, for example an update and/or an input. The converted signal may be transmitted to a display circuit to be displayed on a display of the housing part. The deformation of the elastic control device 140 may be transferred to and/or detected by the apparatus 100. The movement of an object in a display may further provide a sense feedback to the user. For example during gaming, a certain input, or a mode of an application, or an event in a display may be configured to generate a feedback signal, sent back and to be realized providing feedback to the user. By a sense feedback the user may get more immersive or embedded feeling of the application or use of an apparatus 100.

Figure 5:
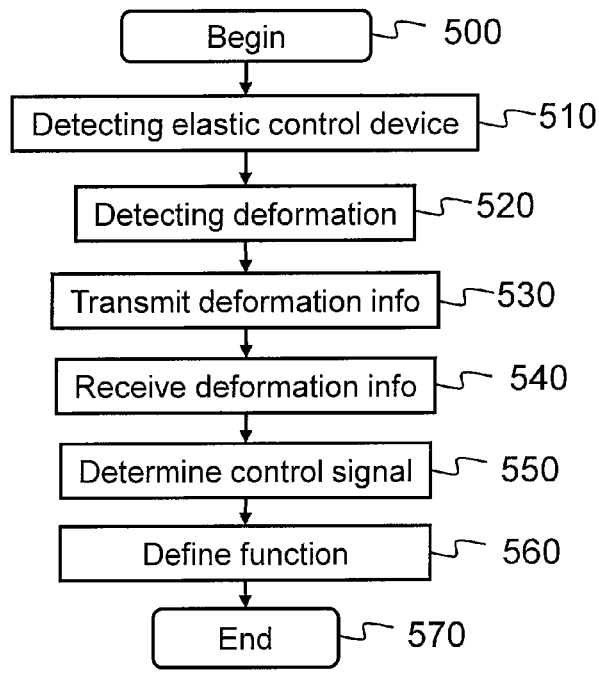
FIG. 5 shows a flow diagram showing operations in accordance with an example embodiment of the invention.

FIG. 5 shows a flow diagram showing operations in accordance with an example embodiment of the invention. In step 500, the method is started. In step 510, an elastic control device is detected by an apparatus. In step 520, deformation of the elastic control device is detected. Information on the deformation is transmitted form the elastic control device to the apparatus in step 530. In step 540, the deformation information is received at the apparatus. A control signal for the apparatus is determined in step 550. In step 560, a function for the apparatus is defined based on the control signal. The method ends in step 570.

Figure 6:
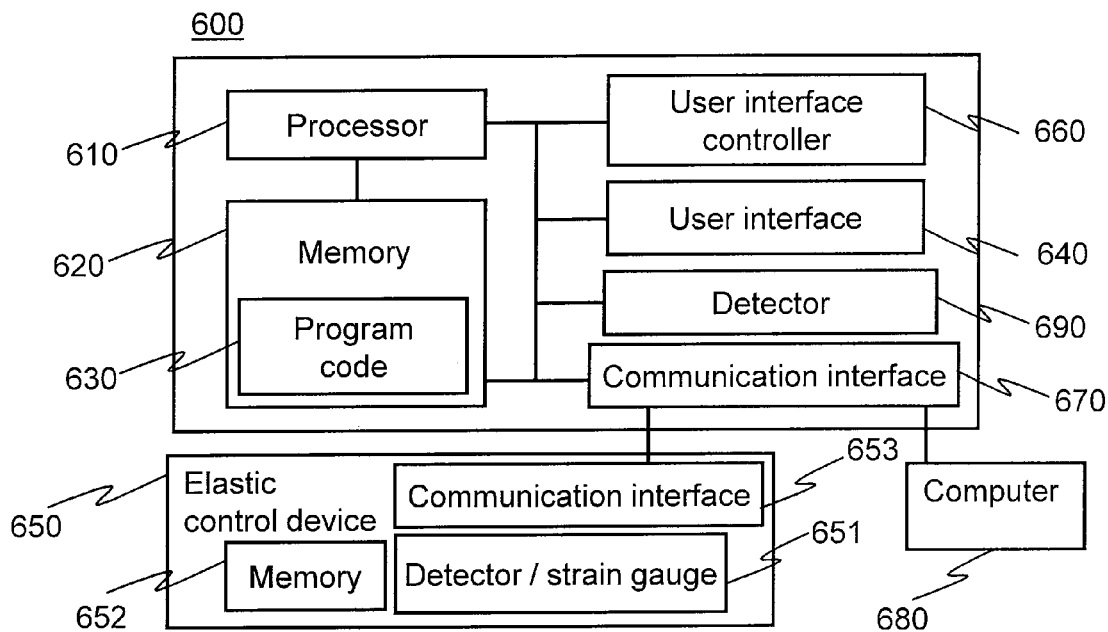
FIG. 6 presents an example block diagram of an apparatus in which various embodiments of the invention may be applied.

FIG. 6 presents an example block diagram of an apparatus 600 and an elastic control device 140 in which various embodiments of the invention may be applied. The apparatus 600 may be a user equipment (UE), user device or apparatus, such as a mobile terminal or other communication device.

The general structure of the apparatus 600 comprises a user interface 640, a communication interface 670, a processor 610, and a memory 620 coupled to the processor 610. The apparatus 600 further comprises software 630 stored in the memory 620 and operable to be loaded into and executed in the processor 610. The software 630 may comprise one or more software modules and can be in the form of a computer program product. The apparatus 600 may further comprise a user interface controller 660.

In an embodiment the apparatus 600 comprises a detector 690 for detecting movement of the apparatus 600. Such detector 690 may comprise for example an accelerometer or a gyroscope.

The general structure of the elastic control device 650 comprises a detector 651 for sensing the deformation, and a communication interface 653. Sensor for the deformation may comprise a strain gauge. The elastic control device may further comprise a memory 652. The detector 651 may further comprise an energy harvester using piezo bending.

In an embodiment, the detector 651, 690 may be one of the following but not limited to a gyroscope, an accelerometer, a strain-gauge, a hall-effect sensor, a conductive ink-based sensor, a fiber-optic sensor, a conductive fabric/thread/polymer-based sensor and an optical sensor. In an example embodiment, the number of detectors in the apparatus 600 is more than one, for example two. The two detectors may be implemented one in the housing part of the apparatus 600 and one in the elastic control device 650. The location of the detector may vary in that the detector may be implemented in the housing part or the detector may be implemented in the elastic control device 650.

The processor 610 may be, e.g., a central processing unit (CPU), a microprocessor, a digital signal processor (DSP), a graphics processing unit, or the like. FIG. 6 shows one processor 610, but the apparatus 600 may comprise a plurality of processors.

The memory 620 may be for example a non-volatile or a volatile memory, such as a read-only memory (ROM), a programmable read-only memory (PROM), erasable programmable read-only memory (EPROM), a random-access memory (RAM), a flash memory, a data disk, an optical storage, a magnetic storage, a smart card, or the like. The apparatus 600 may comprise a plurality of memories. The memory 620 may be constructed as a part of the apparatus 600 or it may be inserted into a slot, port, or the like of the apparatus 600 by a user. The memory 620 may serve the sole purpose of storing data, or it may be constructed as a part of an apparatus serving other purposes, such as processing data.

The first user interface 640 may comprise for example a liquid crystal display (LCD), a light-emitting diode (LED) based display or a touch-sensitive surface. The touch sensitive surface may be integrated to the display as a touch display or a touch screen. The touch-sensitive surface may also be included as a separate element, for example as a touchpad.

The user interface controller 660 may comprise circuitry for receiving input from a user of the apparatus 600, e.g., via a keyboard, graphical user interface shown on the display of the user interfaces 640, 650 of the apparatus 600, speech recognition circuitry, or an accessory device, such as a headset, and for providing output to the user via, e.g., a graphical user interface or a loudspeaker.

The communication interface modules 653, 670 implement at least part of radio transmission. The communication interface modules 653, 670 may comprise, e.g., a wireless or a wired interface module. The wireless interface may comprise such as near field communication (NFC), WLAN, Bluetooth, infrared (IR), radio frequency identification (RF ID), GSM/GPRS, CDMA, WCDMA, or LTE (Long Term Evolution) radio module. The wired interface may comprise such as universal serial bus (USB), for example. The communication interface modules 653, 670 may be integrated into the apparatus 600, into the elastic control device 650, or into an adapter, card or the like that may be inserted into a suitable slot or port of the apparatus 600. The communication interface modules 653, 670 may support one radio interface technology or a plurality of technologies. The apparatus 600 and the elastic control device may comprise a plurality of communication interface modules 653, 670.

In an example embodiment of the invention, the communication interface module 653, 670 comprises at least a first communication interface module and a second communication interface module. The first communication interface module may be located in the housing part of the apparatus 600 and the second communication interface module may be located in the elastic control device 650. The first communication interface module and the second communication interface module may be configured to provide communications between the apparatus 600 and the elastic control device 650. The communications may be wired or wireless, using the above described modules, for example. The communication interface module 653 may further comprise an antenna for inductive charging. The body of the elastic control device 650 may be manufactured from an elastic member material, for example from silicone rubber. In an embodiment, silicone gel surface may be used on top of the detector 651 to generate a soft joystick kind of elastic control device 650.

In an embodiment, a computer 680 may be connected to the apparatus 600. The computer 680 may comprise similar communication interface as the communication interface 670 explained for the apparatus 600. The computer 680 may also comprise processor, memory, program code, user interface controller and user interface as explained for the apparatus 600. The control signal generated by the elastic control device 650 may thus be used for controlling the user interface of a computer 680 connected to the apparatus 600.

A skilled person appreciates that in addition to the elements shown in FIG. 6, the apparatus 600 and the elastic control device 650 may comprise other elements, such as microphones, extra displays, as well as additional circuitry such as input/output (I/O) circuitry, memory chips, application-specific integrated circuits (ASIC), processing circuitry for specific purposes such as source coding/decoding circuitry, channel coding/decoding circuitry, ciphering/deciphering circuitry, and the like. Additionally, the apparatus 600 and the elastic control device 650 may comprise a disposable or rechargeable battery (not shown) for powering when external power if external power supply is not available.

Various embodiments have been presented. It should be appreciated that in this document, words comprise, include and contain are each used as open-ended expressions with no intended exclusivity. If desired, the different functions discussed herein may be performed in a different order and/or concurrently with each other. Furthermore, if desired, one or more of the above-described functions may be optional or may be combined. Although various aspects of the invention are set out in the independent claims, other aspects of the invention comprise other combinations of features from the described embodiments and/or the dependent claims with the features of the independent claims, and not solely the combinations explicitly set out in the claims.

The foregoing description has provided by way of non-limiting examples of particular implementations and embodiments of the invention a full and informative description of the best mode presently contemplated by the inventors for carrying out the invention. It is however clear to a person skilled in the art that the invention is not restricted to details of the embodiments presented above, but that it can be implemented in other embodiments using equivalent means or in different combinations of embodiments without deviating from the characteristics of the invention.

Furthermore, some of the features of the above-disclosed embodiments of this invention may be used to advantage without the corresponding use of other features. As such, the foregoing description shall be considered as merely illustrative of the principles of the present invention, and not in limitation thereof. Hence, the scope of the invention is only restricted by the appended patent claims.

The invention claimed is:

1. An apparatus comprising:
an elastic control device operationally connected to the apparatus and comprising a grip member, wherein the elastic control device is configured to detect deformation movement of the elastic control device in each direction of X-, Y- and Z-axis and to detect deformation rotation around each of X-, Y- and Z-axis in relation with a housing part of the apparatus, wherein the grip member is further configured to be squeezed to provide further deformation;
at least one processor; and
at least one memory including computer program code; the at least one memory and the computer program code configured to, with the at least one processor, cause the apparatus to:
receive deformation information relating to the deformation movement, the deformation rotation and the further deformation from the elastic control device deformed by a user via the grip member;
determine a control signal for the apparatus based on the deformation information; and
performing a function associated to the control signal.

2. The apparatus of claim 1 further comprising a housing part, wherein the elastic control device is operationally connected to the apparatus using an interface on a surface of the apparatus housing part.

3. The apparatus of claim 2, wherein the housing part comprising a front surface with a display and a side surface with an interface for the elastic control device.

4. The apparatus of claim 3, wherein the deformation dimension comprises at least one of the following:
dimension perpendicular to the front surface;
dimension perpendicular to the side surface; and
dimension parallel to the side surface.

5. The apparatus of claim 2, wherein the control signal is configured to control at least one of the following: the housing part, a function of the housing part, an application of the housing part, and a user interface of a computer connected to the apparatus.

6. The apparatus of claim 1, wherein the function comprises at least one of the following:
control information for a user interface of the apparatus;
volume control;
gaming control;
music playing control;
browsing control; and
navigation control.

7. The apparatus of claim 1 further comprising a storage configured to receive the elastic control device.

8. The apparatus of claim 1, wherein the elastic control device comprising an elastic extension of the apparatus and a control device.

9. The apparatus of claim 8, wherein the elastic extension comprising an operating position for receiving the control device.

10. The apparatus of claim 1, wherein the at least one memory and the computer program code further configured to, with the at least one processor, cause the apparatus to:
define a link between a control signal and at least one of the deformation movement, the deformation rotation and further deformation by the user of the apparatus.

11. The apparatus of claim 10, wherein the at least one memory and the computer program code further configured to, with the at least one processor, cause the apparatus to:
define a link between a control signal and simultaneously detected deformation movement and the deformation rotation.

12. The apparatus of claim 10, wherein the at least one memory and the computer program code further configured to, with the at least one processor, cause the apparatus to:
define a sequence comprising at least two of deformation movements, deformation rotations or further deformations as a macro for a control signal.

13. An elastic control device configured to be operationally connected to an apparatus, the elastic control device comprising:
a grip member, wherein the elastic control device is configured to detect deformation movement of the elastic control device by a user via the grip member in each direction of X-, Y- and Z-axis and to detect deformation rotation around each of X-, Y- and Z-axis in relation with a housing part of the apparatus to provide deformation, wherein the grip member is further configured to be squeezed to provide further deformation;
a detector configured to detect the deformation for providing deformation information relating to the deformation movement, the deformation rotation and the further deformation; and
an interface configured to transmit the deformation information to an apparatus for determining a control signal for the apparatus based on the deformation information and for performing a function associated with the control signal.

14. The elastic control device of claim 13, wherein the detector comprising at least one strain gauge for sensing deformation.

15. The elastic control device of claim 13, wherein the detector comprising at least one piezoelectric sensor for sensing deformation.

16. The elastic control device of claim 13, wherein a housing part of the apparatus and the elastic control device are configured to be coupled mechanically.

17. The elastic control device of claim 13, wherein a housing part of the apparatus and the elastic control device are configured to be connected wirelessly.

18. The elastic control device of claim 13, further comprising at least one of the following:
- memory;
- antenna; and
- energy harvester using piezo bending.

19. A method comprising;
- detecting deformation movement of an elastic control device comprising a grip member, in each direction of X-, Y- and Z-axis and deformation rotation around each of X-, Y- and Z-axis in relation with a housing part of an apparatus, for providing deformation, wherein the grip member is further configured to be squeezed to provide further deformation;
- receiving deformation information relating to the deformation movement, the deformation rotation and the further deformation by the apparatus from the elastic control device deformed by a user;
- determining a control signal for an apparatus based on the deformation information; and
- defining a function for the apparatus associated to the control signal.

20. A computer program embodied on a non-transitory computer readable medium comprising computer executable program code which, when executed by at least one processor of an apparatus, causes the apparatus to:
- detect deformation movement of an elastic control device comprising a grip member, in each direction of X-, Y- and Z-axis and deformation rotation around each of X-, Y- and Z-axis in relation with a housing part of an apparatus, for providing deformation, wherein the grip member is further configured to be squeezed to provide further deformation;
- receive deformation information relating to the deformation movement, the deformation rotation and the further deformation by the apparatus from the elastic control device deformed by a user;
- determine a control signal for an apparatus based on the deformation information; and
- define a function for the apparatus associated to the control signal.

* * * * *